United States Patent
Barzik et al.

(10) Patent No.: US 10,972,376 B2
(45) Date of Patent: *Apr. 6, 2021

(54) DISTRIBUTED STORAGE PATH CONFIGURATION

(71) Applicant: International Business Machines Corporation, Armonk, NY (US)

(72) Inventors: Zah Barzik, Rishon Lezion (IL); Alon Marx, Matan (IL); Rivka Matosevich, Zichron-Ya'acov (IL); Osnat Shasha, Holon (IL); Anna Stopel, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,313

(22) Filed: Jun. 3, 2019

(65) Prior Publication Data

US 2019/0288933 A1    Sep. 19, 2019

Related U.S. Application Data

(63) Continuation of application No. 15/885,322, filed on Jan. 31, 2018, now Pat. No. 10,439,927.

(51) Int. Cl.
*H04L 12/28* (2006.01)
*H04L 12/751* (2013.01)
(Continued)

(52) U.S. Cl.
CPC ............ *H04L 45/02* (2013.01); *G06F 3/0607* (2013.01); *G06F 3/067* (2013.01); *G06F 3/0635* (2013.01); *H04L 41/12* (2013.01); *H04L 67/1097* (2013.01)

(58) Field of Classification Search
CPC ..... H04L 45/02; H04L 45/124; H04L 45/128; H04L 45/24; H04L 45/42
(Continued)

(56) References Cited

U.S. PATENT DOCUMENTS 7,249,173 B2    7/2007    Nicolson
7,581,007 B2    8/2009    Yamagami
(Continued)

FOREIGN PATENT DOCUMENTS

CN    100396065 C    6/2008
CN    105892943 A    8/2016

OTHER PUBLICATIONS

Chadalapaka et al, "Internet Small Computer System Interface (iSCSI) Protocol (Consolidated)," Internet Engineering Task Force (IETF), Request for Comments: 7143, pp. 1-295. https://tools.ietf.org/html/rfc7143.

(Continued)

*Primary Examiner* — Dmitry Levitan
(74) *Attorney, Agent, or Firm* — James L. Olsen

(57) ABSTRACT

Aspects of the present disclosure relate to transmitting prioritized path data to a device based on a set of topology rules and metrics associated with a storage target. A storage target path discovery request is received from the device. In response to the storage target path discovery request, metrics associated with the storage target are collected. Based on the collected metrics, available paths to the storage target are identified. A set of topology rules are then determined. Based on the topology rules and the collected metrics, a subset of available paths are selected. The subset of available paths are then prioritized into prioritized path data. The prioritized path data is then stored and transmitted to the device.

18 Claims, 8 Drawing Sheets

(51) Int. Cl.
*G06F 3/06* (2006.01)
*H04L 29/08* (2006.01)
*H04L 12/24* (2006.01)

(58) Field of Classification Search
USPC ... 370/351, 356, 395.2, 395.41, 395.42, 419
See application file for complete search history.

(56) References Cited

U.S. PATENT DOCUMENTS

| | | | |
|---|---|---|---|
| 7,779,428 | B2 | 8/2010 | Umbehocker et al. |
| 7,865,588 | B2 | 1/2011 | Hayden et al. |
| 7,957,398 | B1 | 6/2011 | Yochai et al. |
| 8,832,334 | B2 | 9/2014 | Okita |
| 8,918,537 | B1 | 12/2014 | Sandstrom et al. |
| 9,009,317 | B2 | 4/2015 | Omar |
| 9,336,041 | B2 * | 5/2016 | Raja ................... H04L 45/125 |
| 9,531,623 | B2 | 12/2016 | Besaw et al. |
| 9,645,748 | B2 | 5/2017 | Chien |
| 9,710,194 | B1 | 7/2017 | Watson et al. |
| 10,541,928 | B2 * | 1/2020 | Shih ................... H04L 47/20 |
| 2004/0160973 | A1 | 8/2004 | Jones |
| 2008/0147878 | A1 | 6/2008 | Kottomtharayil et al. |
| 2009/0216886 | A1 | 8/2009 | Zhu et al. |
| 2016/0357457 | A1 | 12/2016 | Chien |
| 2017/0177264 | A1 | 6/2017 | Liu et al. |
| 2019/0007305 | A1 | 1/2019 | Filsfils et al. |

OTHER PUBLICATIONS

Internet Society Requests for Comment (RFCs), Bakke et al., "Finding Internet Small Computer System-Interface (iSCSI) Targets and Name Servers by Using Service Location Protocol version 2 (SLPv2) (RFC4018)," an IP.com Prior Art Database Technical Disclosure, IP.com No. IPCOM000124735D, Electronic Publication: May 5, 2005, Original Publication: Apr. 1, 2015, 26 pages, http://ip.com/IPCOM/000124735.

Koller et al., "I/O Deduplication: Utilizing Content Similarity to Improve I/O Performance," ACM Transactions on Storage, vol. 6, No. 3, Article 13, Sep. 2010, pp. 1-26. DOI: 10.1145/1837915. 1837921.

"What's new in version 11.5.4," IBM Spectrum Accelerate 11.5.4, IBM Knowledge Center, Mar. 3, 2017, pp. 1-3. https://www.ibm.com/support/knowledgecenter/en/STZSWD_11.5.4/RN/xiv_sds_rn_whatsnew.html.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Barzik et al., "Distributed Storage Path Configuration", U.S. Appl. No. 15/885,322, filed Jan. 31, 2018.

IBM, List of IBM Patents or Patent Applications Treated as Related, Jun. 3, 2019, 2 pages.

* cited by examiner

Table 1

| Path | Switch | Node | Port |
|---|---|---|---|
| 1 | 1 | 1 | 1 |
| 2 | 2 | 1 | 1 |
| 3 | 1 | 1 | 2 |
| 4 | 2 | 1 | 2 |
| 5 | 1 | 1 | 3 |
| 6 | 2 | 1 | 3 |
| 7 | 1 | 1 | 4 |
| 8 | 2 | 1 | 4 |
| 9 | 1 | 2 | 5 |
| 10 | 2 | 2 | 5 |
| 11 | 1 | 2 | 6 |
| 12 | 2 | 2 | 6 |
| 13 | 1 | 2 | 7 |
| 14 | 2 | 2 | 7 |
| 15 | 1 | 2 | 8 |
| 16 | 2 | 2 | 8 |

Port Function Prioritization ① →

Table 2

| Path | Switch | Node | Port |
|---|---|---|---|
| 1 | 1 | 1 | 1 |
| 2 | 2 | 1 | 1 |
| 3 | 1 | 1 | 2 |
| 4 | 2 | 1 | 2 |
| 5 | 1 | 1 | 3 |
| 6 | 2 | 1 | 3 |
| 9 | 1 | 2 | 5 |
| 10 | 2 | 2 | 5 |
| 11 | 1 | 2 | 6 |
| 12 | 2 | 2 | 6 |
| 13 | 1 | 2 | 7 |
| 14 | 2 | 2 | 7 |
| 7 | 1 | 1 | 4 |
| 8 | 2 | 1 | 4 |
| 15 | 1 | 2 | 8 |
| 16 | 2 | 2 | 8 |

Network Failure Resiliency Prioritization ②

Table 3

| Path | Switch | Node | Port |
|---|---|---|---|
| 1 | 1 | 1 | 1 |
| 2 | 2 | 1 | 1 |
| 3 | 1 | 1 | 2 |
| 4 | 2 | 1 | 2 |
| 5 | 1 | 1 | 3 |
| 6 | 2 | 1 | 3 |
| 9 | 1 | 2 | 5 |
| 10 | 2 | 2 | 5 |
| 11 | 1 | 2 | 6 |
| 12 | 2 | 2 | 6 |
| 13 | 1 | 2 | 7 |
| 14 | 2 | 2 | 7 |
| 7 | 1 | 1 | 4 |
| 8 | 2 | 1 | 4 |
| 15 | 1 | 2 | 8 |
| 16 | 2 | 2 | 8 |

Node Failure Resiliency Prioritization ③ →

Table 4

| Path | Switch | Node | Port |
|---|---|---|---|
| 1 | 1 | 1 | 1 |
| 10 | 2 | 2 | 5 |
| 3 | 1 | 1 | 2 |
| 12 | 2 | 2 | 6 |
| 5 | 1 | 1 | 3 |
| 14 | 2 | 2 | 7 |
| 9 | 1 | 2 | 5 |
| 2 | 2 | 1 | 1 |
| 11 | 1 | 2 | 6 |
| 4 | 2 | 1 | 2 |
| 13 | 1 | 2 | 7 |
| 6 | 2 | 1 | 3 |
| 15 | 1 | 2 | 8 |
| 8 | 2 | 1 | 4 |
| 7 | 1 | 1 | 4 |
| 16 | 2 | 2 | 8 |

FIG. 3B

DISTRIBUTED STORAGE PATH CONFIGURATION

BACKGROUND

The present disclosure relates generally to the field of computing, and more particularly to distributed computing environments.

The amount of data that needs to be organized by enterprises is increasing. Accordingly, management of a shared pool of computing resources over a network can be desired to increase performance efficiency. For example, storage area networks (SAN's) can be used to provide access to block level data storage over a network. These systems can ensure that computing nodes in a distributed computing environment receive the memory required to store the ever-increasing amount of data associated with the computing nodes. SAN's enhance computing nodes such that memory provided over the network appears to the operating system (OS) to be locally attached memory (e.g., hard drives).

SUMMARY

Embodiments of the present disclosure relate to transmitting prioritized path data to a device based on a set of topology rules and metrics associated with a storage target. A storage target path discovery request can be received from the device. In response to the storage target path discovery request, metrics associated with the storage target can be collected. Based on the collected metrics, available paths to the storage target can be identified. A set of topology rules can then be determined. Based on the topology rules and the collected metrics, a subset of available paths can be selected. The subset of available paths can then be prioritized into prioritized path data. The prioritized path data can then be stored and transmitted to the device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3B is a diagram illustrating an example prioritization scheme for the paths depicted in FIG. 3A, in accordance with embodiments of the present disclosure.

Figure 1:
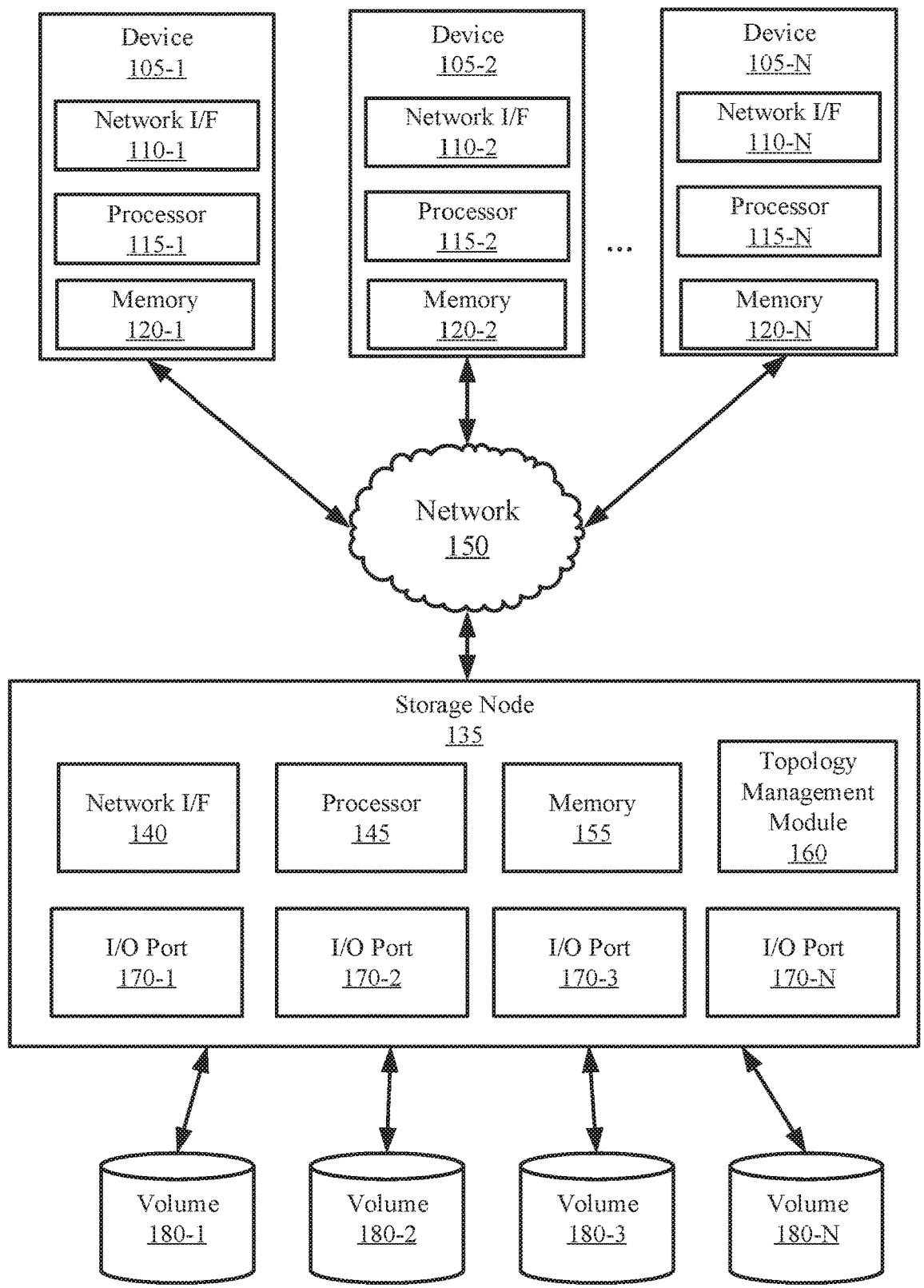
FIG. 1 is a block diagram of an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to distributed computing environments. While the present disclosure is not necessarily limited to such applications, various aspects of the disclosure may be appreciated through a discussion of various examples using this context.

Internet Small Computer Systems Interface (iSCSI) is an internet protocol (IP) networking standard for storage system data transfer. In the iSCSI context, a path (e.g., iSCSI Transport) maps a client-server iSCSI protocol to a specific interconnect. An initiator (e.g., iSCSI client or host) is the start of the path and a target (e.g., iSCSI server, storage resource, storage node, etc.) is the endpoint of the path. An initiator begins the iSCSI communication by dispatching iSCSI commands over the network. Specifically, initiators can first request possible paths from storage system(s) (e.g., which can include multiple targets) via an iSCSI discovery session. Upon receipt of the discovery request (e.g., a "SendTargets" request) the storage system can return a list of all iSCSI paths available to the initiator to reach the targets.

After the list of iSCSI paths is received, the initiator can begin iSCSI login to the target ports and start transmitting input/outputs (I/Os) via the created paths, one port at a time. When transmitting I/O's, initiators can utilize several ports with respect to a predefined scheduling algorithm (e.g., most recently used, round robin, fixed, etc.). The initiators can access the targets returned by the storage system in the order they are received via the "SendTargets" response. Thus, when providing the list of paths in response to the discovery request, it can be beneficial to consider various metrics to determine the order of paths returned to the initiator.

Various metrics can be considered when providing the list of paths to the initiator. In some instances, network failure resiliency can be considered in order to provide a list of paths that ensures the initiator has access to multiple network nodes (e.g., switches, hubs, bridges, routers, etc.). This ensures that, if any single network node fails, the initiator can connect to a path with an operational network node. The path data (e.g., path list, path table, etc.) can also be configured based on resource utilization. For example, the path data can be configured to uniformly distribute workloads (e.g., bandwidth consumption or processor utilization) across hardware components in the system. In some instances, storage node failure resiliency can be considered. This ensures that, if any single storage node (e.g., storage controller, server, etc.) fails, the initiator can connect to the target via an operational storage node. Further, port functionality (e.g., ports that have a specified function) can be considered when providing a list of paths to the initiator. For example, ports used for resource intensive tasks (e.g., mirroring or data migration) can be removed from the list or returned at the end of the list (e.g., to a position in which the port will be accessed last), to avoid relying on paths with ports or storage nodes that have less available bandwidth.

Referring now to the figures, FIG. 1 is a block diagram illustrating an example computing environment 100 in which illustrative embodiments can be implemented. The computing environment 100 includes a storage node 135 communicatively coupled to volumes 180-1, 180-2, 180-3 . . . 180-N (herein collectively referred to as volume 180). The storage node 135 is additionally communicatively coupled to a plurality of devices 105-1, 105-2 . . . 105-N (collectively referred to as device 105) via a network 150.

Consistent with various embodiments, the storage node 135 and the device 105 are computer systems. The device 105 and the storage node 135 include one or more processors 115-1, 115-2 . . . 115-N (collectively processor 115) and 145 and one or more memories 120-1, 120-2 . . . 120-N (collectively memory 120) and 155, respectively. The device 105 and the storage node 135 are configured to communicate with each other through internal or external network interfaces 110-1, 110-2 . . . 110-N (collectively network interface 110) and 140. The network interfaces 110 and 140 are, in some embodiments, modems or network interface cards. The device 105 and/or the storage node 135 can be equipped with a display or monitor. Additionally, the device 105 and/or the storage node 135 include optional input devices (e.g., a keyboard, mouse, scanner, video camera, or other input device), and/or any commercially available or custom software (e.g., browser software, communications software, server software, natural language processing software, search engine and/or web crawling software, filter modules for filtering content based upon predefined parameters, etc.). The device 105 and/or the storage node 135 can be servers, controllers, desktops, laptops, hand-held devices or any combination thereof.

The device 105 and the storage node 135 can be distant from each other and communicate over a network 150. In some embodiments, the storage node 135 can be a central hub from which devices 105 can establish a communication connection, such as in a client-server networking model. Alternatively, the storage node 135 and device 105 can be configured in any other suitable networking relationship (e.g., in a peer-to-peer (P2P) configuration or other network topology).

In some embodiments, the network 150 can be implemented using any number of any suitable communications media. For example, the network 150 can be a wide area network (WAN), a local area network (LAN), an internet, or an intranet. In certain embodiments, the device 105 and the storage node 135 can be local to each other, and communicate via any appropriate local communication medium. For example, the device 105 and the storage node 135 can communicate using a local area network (LAN), one or more hardwire connections, a wireless link or router, or an intranet. In some embodiments, the device 105 and the storage node 135 can be communicatively coupled using a combination of one or more networks and/or one or more local connections. For example, the first device 105-1 can be hardwired to the storage node 135 (e.g., connected with an Ethernet cable) while the second device 105-2 can communicate with the storage node 135 using the network 150 (e.g., over the Internet). Additionally, the storage node 135 can be communicatively coupled to the volume 180 using the network 150. However, in some embodiments, the volume 180 can be locally attached to the storage node 135.

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The storage node 135 includes a plurality of input/output (I/O) ports 170-1, 170-2, 170-3 . . . 170-N (herein collectively referred to as I/O port 170). The I/O ports 170 can be endpoint communication addresses (e.g., IP addresses) associated with the storage node 135. Specifically, the I/O port 170 allows the device 105 to interface the storage targets (e.g., volumes 180) via paths (e.g., network paths) over the network 150.

Though a single storage node 135 is depicted in FIG. 1, in embodiments, any number of storage nodes 135 can be implemented. Further, each storage node can include any number of subunits (e.g., sub-nodes) and any number of I/O ports. For example, in some embodiments, computing environment 100 can include five storage nodes each including 20 I/O ports.

The storage nodes can be implemented in any manner. In the embodiment depicted in FIG. 1, the storage node 135 is depicted as a server, having its own hardware resources (e.g., processor 145 and memory 155). However, in embodiments, the storage node 135 can be a virtualized partition of a server (e.g., a virtual machine running on the server) or machine. In some embodiments, the storage node 135 can include a plurality of servers and/or virtual machines. In some embodiments, the storage node 135 can be a portion of hardware (e.g., a storage controller) located on a server. However, the storage node can be implemented in any other manner otherwise consistent herein.

The volume 180 can include any suitable storage. In some embodiments, the volume 180 is structured into block storage. The volume 180 can include magnetic tape storage, NAND flash memory, floppy disks, hard disks, optical disks, and the like. In some embodiments, the storage volume 180 can be remote and accessible over a storage area network (SAN) (e.g., via iSCSI or ATA over Ethernet (AoE) protocols). However, in some embodiments, the volume 180 can be directly attached and accessible via SCSI or Fibre Channel.

The storage node 135 includes a topology management module 160. The topology management module 160 can be configured to receive a target discovery requests (e.g., destination discovery requests) from the device 105 and provide target path data (e.g., path lists, path tables, etc.) to the device 105. Because the device 105 (e.g., initiators in an iSCSI environment) typically logs in to the target paths in the order they are received via the discovery response (e.g., "SendTargets" response), it can be beneficial to filter and prioritize the path data prior to transmission to the device 105. Accordingly, the topology management module 160 can analyze a variety of metrics (e.g., the number of network nodes, the number of I/O nodes, the number of storage nodes, available storage, available bandwidth (per port or per node), processor utilization (per port or per node), etc.) associated with the storage node 135 and use the metrics, along with configurable topology rules, to selectively filter and prioritize the list of paths to be returned to the device 105.

The topology management module 160 can be configured to collect a variety of metrics in the system. The metrics collected by the topology management module 160 can include identification of all paths configured between the device 105 and storage node 135. The paths can include the network topology logic which bridges the initiator to the target. For example, the paths can include the following logic format: (initiator →network node →I/O port). To identify the paths between the devices 105 and volumes 180, the topology management module 160 can be configured to acquire all combinations of network nodes and I/O ports 170 which allow each device 105 to access the volumes 180.

Further, the topology management module 160 can be configured to determine a set of topology rules with respect to the list of identified paths. The topology rules can dictate prioritization with respect to the list of identified paths by taking into account various constraints, including network failure resiliency, node failure resiliency, port function, and resource utilization, to name a few. Based on the topology rules, the topology management module 160 can select a subset of paths and prioritize the selected subset of paths prior to transmission to the device 105. The device 105 can then perform log-in to the paths based on the received path data from the topology management module 160.

In some embodiments, software defined networking (SDN) technologies can be utilized to reconfigure the network topology as needed. This can allow the system to dynamically reconfigure network topology via rules for packet handling specified in computer readable code (e.g., a SDN application).

While FIG. 1 illustrates a computing environment 100 with a single storage node 135, suitable computing environments for implementing embodiments of this disclosure can include any number of storage nodes. The various models, modules, systems, and components illustrated in FIG. 1 can exist, if at all, across a plurality of storage nodes and devices. For example, some embodiments can include three storage nodes. The three storage nodes can be communicatively coupled using any suitable communications connection (e.g., using a WAN, a LAN, a wired connection, an intranet, or the Internet). Further, in some embodiments, the topology management module 160 is included on one or more devices 105 or volumes 180.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

Figure 2:
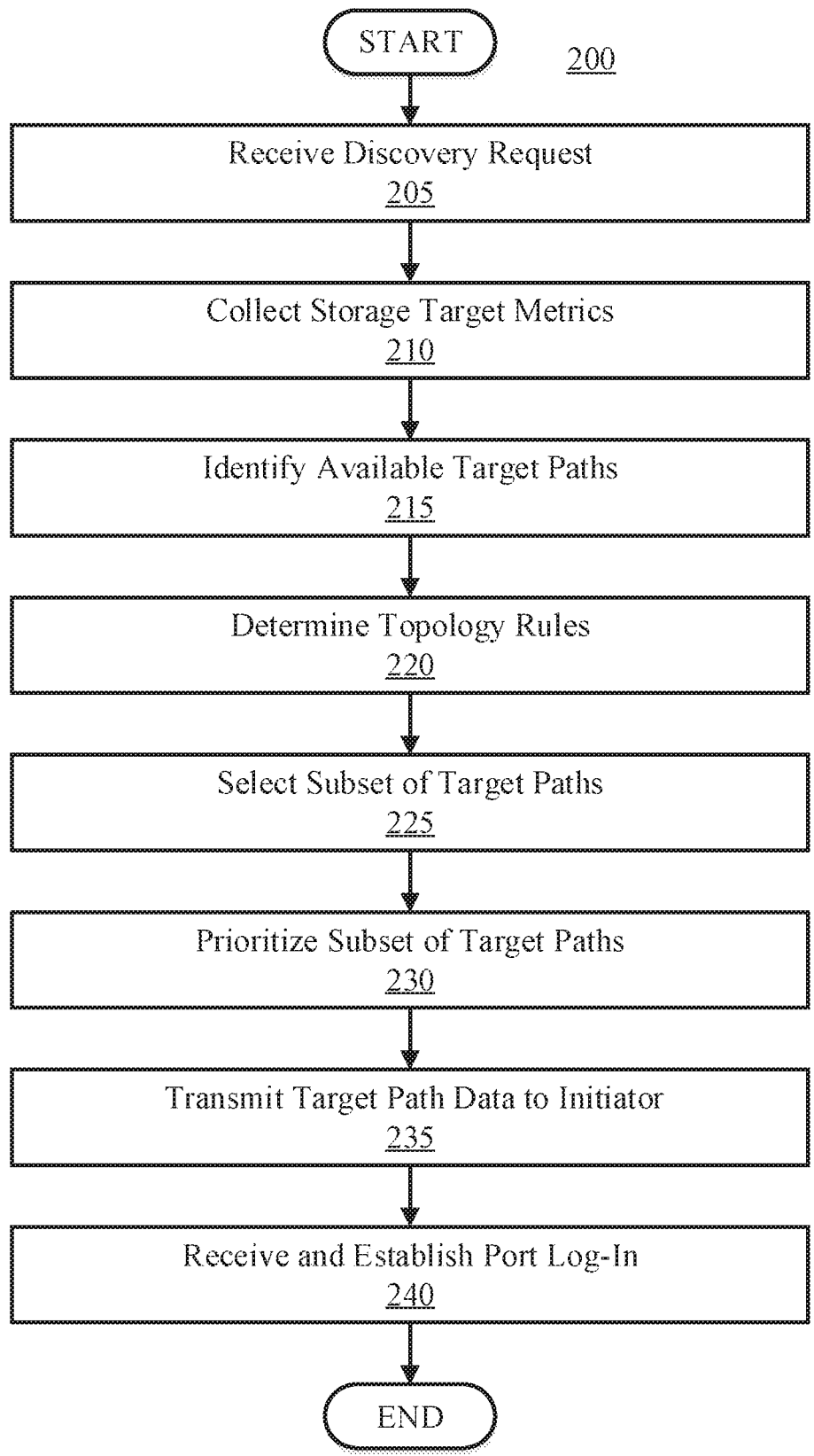
FIG. 2 is a flow diagram illustrating a process for selecting and prioritizing target path data based on a set of topology rules, in accordance with embodiments of the present disclosure.

FIG. 2 is a flow diagram illustrating a process 200 for selecting and prioritizing path data (e.g., a storage target path list) based on a set of topology rules, in accordance with embodiments of the present disclosure.

Process 200 begins by receiving a discovery request. This is illustrated at step 205. The discovery request queries a storage node (e.g., storage controller, server, virtual machine, etc.) receiving the request to provide a list of possible paths (e.g., interfaces) that connect the requesting device (initiator) to the storage node (e.g., target). As such, receiving a discovery request initiates a path discovery process. In some embodiments, the discovery request is issued in an iSCSI protocol. The discovery request can be initiated on a pull or push basis. For example, in some embodiments, a storage node (e.g., storage node 135) can request a discovery request (e.g., on a pull basis). In some embodiments, the device (e.g., device 105-1) can transmit the discovery request (e.g., on a push basis).

The discovery request can be received in any manner. In some embodiments, the discovery request is received over a network (e.g., network 150). In some embodiments, the discovery request is locally initiated (e.g., by a user). The discovery request can be associated with a specific machine. For example, a discovery request received from a device over a network can enable the receiving storage node to determine the possible interfaces associated with the requesting machine.

In some embodiments, upon receiving the discovery request, the entity (e.g., user or machine) transmitting the request can be authenticated. Authentication methods can include passwords, cryptographic authentication, and biometric authentication, and others. Further, the authentication can include a combination of protocols (e.g., two-factor authentication or three-factor authentication).

Storage target metrics are then collected following the discovery request. This is illustrated at step 210. Collecting storage metrics can allow the storage node receiving the request to analyze and identify various metrics related to the storage targets. For example, topology data can be collected. The topology data can indicate topology logic that interfaces the device with the target storage. As such, topology data can include specific network nodes (e.g., switches, hubs, bridges, etc.), storage nodes (e.g., servers or controllers) and/or I/O ports that connect the requesting device to the storage resources. In some embodiments, resource utilization by each storage node and I/O port can be collected. For example, processor utilization and bandwidth for each storage node or I/O port can be collected. In some embodiments, processor utilization can be collected via Task Manager or system monitor. In some embodiments, bandwidth can be determined via a speed test. In some embodiments, I/O port function data can be collected. The I/O port function data can indicate specific functions of individual ports (e.g., ports used for migration, back-up, or mirroring). In some embodiments, topology data can be collected by a software defined networking application. In some embodiments, geographic location data can be collected such that the path data can be prioritized based on proximity or other geographic considerations. In some embodiments, historical error data associated with specific network nodes, storage nodes, and ports can be collected. The historical error data can include the downtime of specific ports, storage nodes, and network nodes overtime (e.g., as a result of maintenance, crashes, etc.). However, any other data associated with the storage system can be collected, and can depend on the sought path selection and prioritization.

After storage target metrics are collected, available target paths are identified. This is illustrated at step 215. Based on the collected topology logic data, paths that interface the initiator to the storage target can be identified. The paths can be stored in a list, table, or any other format. In some embodiments, path data is dispatched to each storage node associated with the requesting device. The path data can then be stored in local memory on each storage node. In some embodiments, the path data is stored in a database associated with each storage node.

A set of topology rules are then determined. This is illustrated at step 220. A set of topology rules can be applied to selectively filter and prioritize the path data. The set of topology rules can be determined in any manner. In some embodiments, the set of topology rules are defined and provided to the system (e.g., manually by a user). In some embodiments, the set of topology rules are dynamically determined (e.g., automatically determined by a computer system without user intervention) based on the collected storage target metrics. For example, the topology rules can be automatically determined based on the observed number of network, storage nodes, the total number of identified paths, the resource utilization associated with each storage node, etc. The set of topology rules can also depend on a configured I/O port scheduling algorithm for each machine.

In some embodiments, the set of topology rules includes network failure resiliency rules. The network failure resiliency rules can provide resiliency to network node failures. This can ensure that the clients maintain communication with the storage resources in the event that there are network node failures (e.g., switches that lose power or malfunction). The network failure resiliency rules can define a threshold number of network nodes required to be returned in the list of paths (e.g., the list must contain a minimum threshold value of five switches). This can ensure that the initiator has access to a minimum number of network nodes at any particular time, which can reduce the likelihood of a communication loss between the initiator and the storage resources. In some embodiments, the network failure resiliency rules can also define a network failure resiliency prioritization scheme. The network failure resiliency prioritization scheme can define path order based on network node identifications (e.g., indicators that distinguish between particular network nodes). For example, if there are four different switches configured in paths included in the target path data, the scheme can be configured to interleave the paths containing the different switches (e.g., order the paths with different network nodes in an alternating manner), such that if a single switch fails, the next path included in the path data contains a different network switch (for more detail, see FIG. 3B, Tables 2 and 3). The prioritization can ensure that no two sequential paths included in the path data have the same network node identification.

However, the network failure resiliency prioritization scheme can be configured in any other manner. For example, in some embodiments, the network failure resiliency prioritization scheme can take into consideration the robustness of particular network nodes. The robustness of particular network nodes can be determined manually, or alternatively based on historical error data (e.g., how many packet forwarding errors occurred in the past, how many outages the network node had in the past, past maintenance, future maintenance, the overall downtime of the network node per time metric, etc.). As such, the network failure resiliency scheme can prioritize paths based on the robustness of particular network nodes. As an example, if historical failure data is collected for three network nodes "A", "B", and "C", and their overall downtime per month is 10 minutes, 20 seconds, and 1 hour, respectively, then the network failure resiliency scheme can assign network node "B" the highest priority, network node "A" intermediate priority, and network node "C" the lowest priority.

Though unconventional path log-ins (e.g., log-ins to network nodes which are not proximate to the initiator or ports which are not normally accessed) may result based on the network failure resiliency rules, the connected initiators may have a higher likelihood of maintaining connection with the target resources in the event of network node failures.

In some embodiments, the set of topology rules include storage node failure resiliency rules. The storage node failure resiliency rules provide resiliency to storage target connection failures in the event that storage node(s) in the system are unavailable (e.g., lose power, malfunction, are scheduled for maintenance, etc.). The storage node failure resiliency rules can be defined in substantially a similar manner to the network node failure resiliency rules referenced above. For example, the storage node failure resiliency rules can define a threshold number of storage nodes required to be returned in the list of paths (e.g., the list must return a minimum number of storage nodes). This can ensure the initiator has availability to a minimum number of storage nodes in the event any storage node(s) are unavailable for any reason. Similarly, the storage node failure resiliency rules can also define a storage node failure resiliency prioritization scheme. In some embodiments, the storage node failure resiliency prioritization scheme can be defined to interleave paths containing different storage nodes. This can ensure that if a particular storage node fails, the initiator will connect to a path with a different storage node upon failure of the storage node which the initiator was already connected to. Ultimately, storage node failure prioritization scheme can ensure that no two sequential paths included in the path data include the same storage node.

Further, the storage node failure resiliency prioritization scheme can also take into consideration the robustness of specific storage nodes. In some embodiments, the robustness of particular storage nodes can be determined based on historical failure data (e.g., server downtime, maintenance data, data corruptions, etc.). As an example, if historical failure data is collected for three storage nodes "A", "B", and "C", and the scheduled maintenance downtime annually is 1 week, 3 days, and 12 hours, respectively, then the network failure resiliency scheme can assign network node "C" the highest priority, network node "B" intermediate priority, and network node "A" the lowest priority.

In some embodiments, the topology rules can include port function rules. Specific I/O ports associated with storage nodes can be used for different functions (e.g., mirroring, migration, back-up, etc.). Accordingly, storage resource availability can depend heavily on the port function. The port function rules can define path selection and prioritization based on port function metrics. For example, if a given port is used for data migration, the port can be returned at the end of the list (accessed by the initiator last) initially (or alternatively can be removed from the port selection) to prevent the device from interfacing a port used for data migration (which is likely to have less available bandwidth). In some embodiments, the port function metric can be numerically represented (e.g., by a fraction, integer, etc.). For example, a non-functional port (a port without a dedicated function) can be assigned a port function metric of 0, while a dedicated functional port can be assigned a port function metric of 1. In some embodiments, if certain ports are not entirely dedicated functional ports, they can be given an intermediate port functional metric (e.g., following the example above, 0.5). The ports can then be prioritized based on the port function metrics according to the port function rules. Following the example above, the port without a dedicated function could be assigned the highest priority (e.g., moved to the beginning of the path list such that it is accessed first) and the dedicated functional port could be assigned the lowest priority (e.g., moved to the end of the path list such that it is accessed last), while the intermediate functional port could be assigned intermediate priority.

In some embodiments, the topology rules can include resource utilization rules. The resource utilization rules can define path selection and prioritization based on available storage node computing resources. In some embodiments, the resource utilization rules can define a list of paths to each client such that a particular resource (e.g., processor utilization or bandwidth) is uniformly utilized throughout the system.

For example, if four I/O ports, "A", "B", "C", and "D" are available to a given initiator, and ports "A" and "C" have half of the available bandwidth than ports "B" and "D" have, paths containing ports "A" and "C" can be returned at the end of the path list (e.g., and thus be accessed last by the initiator). This can ensure that the paths with less available bandwidth are accessed by the initiator last, which could reduce bottlenecks in low bandwidth paths and improve storage resource retrieval.

As an example for available processor utilization, if three storage nodes "X", "Y", and "Z" have 25%, 40%, and 60% processor availability respectively, paths including storage node "Z" can be issued high priority, paths including storage node "Y" can be issued intermediate priority, and paths including storage node "X" can be issued low priority. This can ensure that paths with low processor availability are accessed last, such that any particular processor (e.g., or processor partition) is not overburdened. The availability of any computer resource (e.g., CPU utilization, RAM availability, bandwidth availability, etc.) can be considered in the resource utilization rules.

In some embodiments, the topology rules can specify geographic location rules. The geographic location rules can define path prioritization and selection based on proximity to the initiator. Prioritizing paths containing path hardware (e.g., network and storage nodes) proximate to the initiator can reduce latency and improve storage target retrieval. For example, if a three storage nodes "M", "N" and "O", are located in California, Wis., and New York, respectively, and the initiator that issued the discovery request is located in Minnesota, then paths containing storage node "N" from Wisconsin can be issued high priority, as they are the closest to the initiator that issued the discovery request. The paths containing storage nodes "M" and "O" could be then issued lower priority (e.g., intermediate and low priority depending on their proximity to the initiator).

Further, the topology rules can specify hardware characteristic rules (e.g., the type or specifications of hardware included in the paths). This can allow paths that include hardware with higher performance or compatibility to be prioritized higher in the path data. The hardware characteristic rules can specify specific processor types (e.g., manufacturers or architectures), memory types (e.g., solid state drives vs. hard disk drives), and network hardware types (e.g., network interface cards, fiber optic cables, Ethernet, etc.).

In some embodiments, the topology rules can specify several rules simultaneously. In these embodiments, the topology rules can be weighed or applied sequentially to the available paths in the system. For example, in some embodiments, node failure resiliency and network failure resiliency rules can be defined in the topology rules, and can be applied to prioritize the path data (e.g., see FIG. 3B, Tables 3 and 4). As another example, available processor utilization and bandwidth can be considered simultaneously in the topology rules. In this example, three paths "A", "B", and "C" have available processor utilization metrics of 0.25, 0.50, and 0.75 respectively, and available bandwidth metrics of 0.60, 0.40, and 0.20 respectively (e.g., based on normalized values collected during step 210). If prioritization is completed solely based on available processor utilization, the path order output (e.g., from highest priority to lowest priority) would be: "C", "B", "A" (e.g., 0.75, 0.50, 0.25). Conversely, if prioritization is completed solely on available bandwidth, the order would be reversed to: "A", "B", "C" (0.60, 0.40, 0.20). If both processor utilization availability and bandwidth availability are simultaneously considered based on the sum of the available bandwidth and processing power with no weighted values, the prioritization order would be "C", "B", "A" (e.g., 0.95, 0.90, 0.85). If, however, both processor and bandwidth availability are simultaneously but with bandwidth availability having twice the weight as processor utilization availability, the output would be "A", "B", "C" (e.g., 1.45, 1.30, 1.15). Accordingly, the topology rules can be configurable based on weighted values.

After topology rules are defined, a subset of target paths is selected. This is illustrated at step 225. The subset of target paths is selected according to the topology rules. For example, if the topology rules specify that 10 available paths are to be returned to the client, 10 paths can be selected. The selected paths can depend on the applied topology rules (e.g., excluding paths with functional ports or low resource utilization). In some embodiments, paths can be selected based on one or more predefined thresholds specified in the topology rules. For example, paths can be selected to satisfy a minimum number of network nodes or storage nodes. In some embodiments, all paths are automatically selected. However, paths can be selected in any other manner otherwise consistent herein.

The subset of selected target paths is then prioritized (e.g., the selected path data is ordered). This is illustrated at step 230. The selected target paths can be prioritized based on the topology rules. For example, the selected target paths can be prioritized based on network failure resiliency rules (e.g., interleaving network nodes), storage failure resiliency rules (e.g., interleaving storage nodes), resource utilization rules (e.g., to uniformly utilize system resources), or port function rules (e.g., to avoid ports with low resource utilization based on port function). If a combination of parameters is defined in the set of topology rules, the path data can be prioritized based on weighing the various rules or applying the specific metrics in a pre-defined order.

The target path data is then transmitted to the initiator. This is illustrated at step 235. Transmitting the target paths at step 235 can be completed in any manner. The target paths can be transmitted over a network (e.g., network 150) to the device requesting the discovery session. In some embodiments, prior to transmitting the target paths, the target paths are stored in a database (e.g., on a storage node associated with the paths). The target path transmission can include an indication that the path data discovery request was successfully processed. Further, the transmission can include the topology rules used to structure the path data. In some embodiments, the applied scheduling algorithm (or a suggested scheduling algorithm) can be transmitted along with the path transmission.

A port log-in based on the path data may then be received, and the port log-in is established (e.g., by the storage node). This is illustrated at step 240. The port log-in can include a request to access the first prioritized path of the path data. However, in some embodiments, the port log-in request can include several paths on the list simultaneously (e.g., to connect to the storage target via two or more paths simultaneously). The port log-in can also depend on a pre-defined scheduling algorithm (e.g. fixed, round-robin, most recently used, etc.). After the applicable port log-in(s) are received, the storage node establishes the connection by validating the port log-in request(s), thereby connecting the initiator to the storage system based on the logged path(s). Validation can include any authentication protocols (e.g., passwords, biometric scanners, cryptographic methods, etc.).

The aforementioned steps may be completed in any order and are not limited to those described. Additionally, some, all, or none of the aforementioned steps may be completed, while still remaining within the spirit and scope of the present disclosure. For example, in some embodiments, selecting target paths at step 225 is not completed. In some embodiments, prioritization at step 230 can be completed prior to selection at step 225 (e.g., the ports can be prioritized and lower priority ports can be filtered during selection).

Figure 3A:
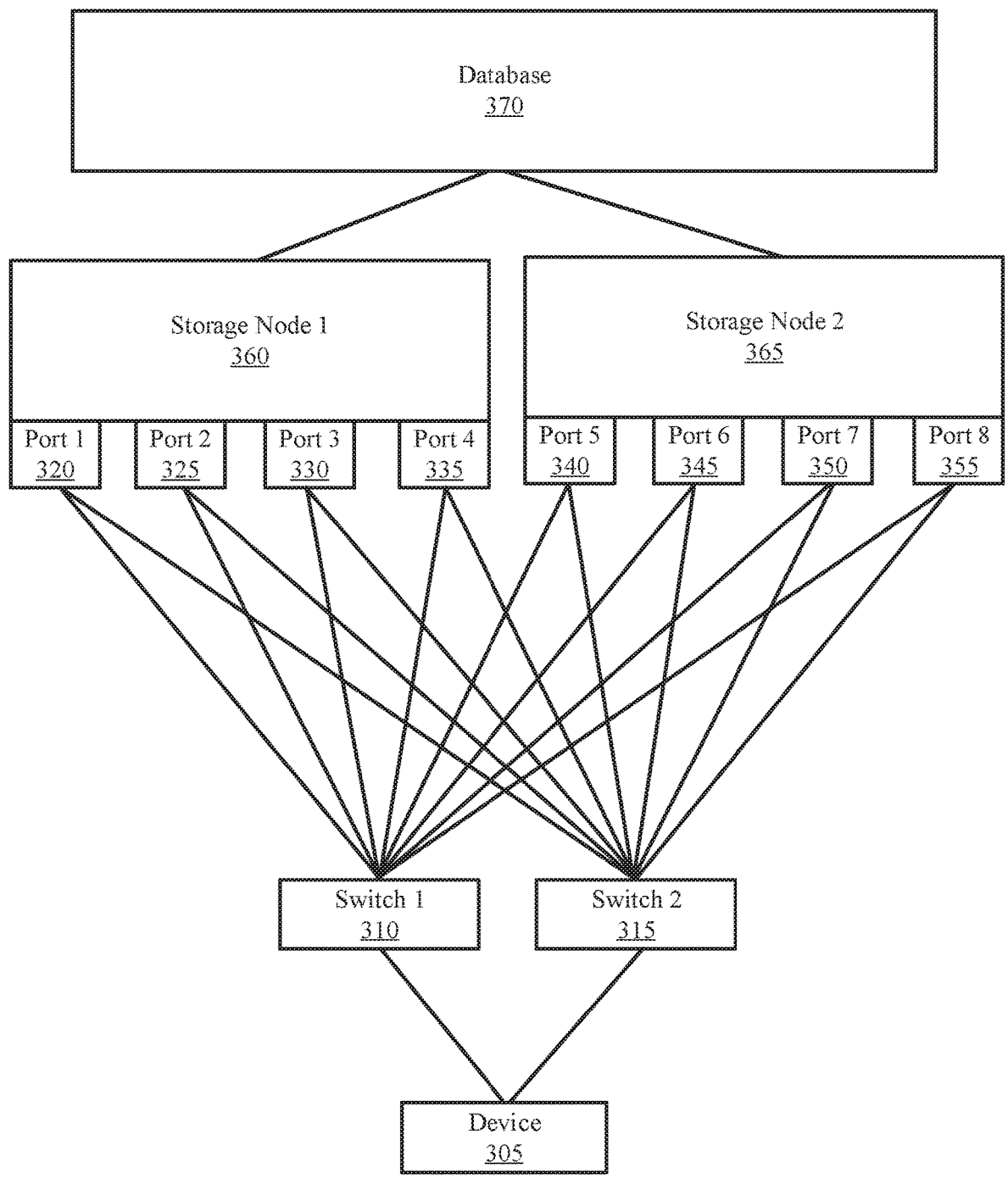
FIG. 3A is a block diagram illustrating paths configured between a device and a database, in accordance with embodiments of the present disclosure.

FIG. 3A is a block diagram illustrating paths configured between a device 305 (e.g., device 105 of FIG. 1) and a database 370, in accordance with embodiments of the present disclosure. FIG. 3A illustrates the device 305 communicatively coupled to the database 370 via two switches 310 and 315, eight ports 320, 325, 330, 335, 340, 345, 350 and 355, and two storage nodes 360 and 365. As illustrated in FIG. 3A, there are 16 possible paths from the device 305 to the database 370. Each path utilizes at least one switch, one port, and one storage node. Accordingly, each path can be denoted by (switch #, storage node #, port #, see FIG. 3B).

If the device 305 (e.g., the initiator) transmits a discovery request to the database 370 (e.g., through storage node 360 or storage node 365), the list returned to the initiator may include each of the 16 paths (if the paths are not filtered). However, because the initiator typically logs into the ports in the order they are received, the path data can be processed (e.g., selectively filtered and prioritized based on topology rules and observed metrics) prior to transmitting the path data to the device 305. Accordingly, the storage nodes 360 and 365 can be configured to obtain metrics related to the overall system (e.g., the number of network nodes, the number of I/O ports, the number of storage nodes, available storage, available bandwidth, processor utilization, etc.), and use the metrics, along with configurable topology rules, to selectively filter and prioritize the paths prior to transmission to the device 305.

While FIG. 3A illustrates a computing environment with two storage nodes, two switches, and eight ports, suitable computing environments for implementing embodiments of this disclosure can include any number of storage nodes, switches, and ports. The various models, modules, systems, and components illustrated in FIG. 3A can exist, if at all, across a plurality of hardware components.

It is noted that FIG. 3A is intended to depict the representative major components of an example computing environment. In some embodiments, however, individual components can have greater or lesser complexity than as represented in FIG. 3A, components other than or in addition to those shown in FIG. 3A can be present, and the number, type, and configuration of such components can vary.

Referring now to FIG. 3B, shown is a diagram illustrating an example prioritization scheme for the 16 paths depicted in FIG. 3A, in accordance with embodiments of the present disclosure. The prioritization scheme depicted in FIG. 3B occurs in three sequential stages: a port function prioritization stage, a network failure resiliency prioritization stage, and a storage node failure resiliency prioritization stage. Prior to the port function prioritization stage, the system (e.g., storage nodes 360 and 365) collects metrics regarding the initiator's (device 305) connection to the storage target (database 370). Specifically, all paths connecting device 305 to the database 370 are identified, along with all available network nodes, storage nodes, and ports.

Table 1 depicts an initial layout of the identified paths, with their respective switch number, storage node number, and port number. The initial path table may be configured in the order each path is discovered. The initial port list is then prioritized according to topology rules. The topology rules include each of the prioritization stages depicted in FIG. 3B. Table 2 depicts the path table prioritized according to a port function prioritization stage (the first prioritization stage as indicated by the circled number). Ports 4 and 8 (e.g., ports 335 and 355 in FIG. 3A) are ports dedicated to mirroring, and thus are likely to have less available bandwidth (or may have less available bandwidth upon future mirroring). Accordingly, each path including ports 4 and 8 is returned at the end of the list, as the mirroring ports are the lowest priority paths according to the topology rules. The network failure resiliency prioritization stage (the second stage as indicated by the circled number) is then applied to ensure the clients connected to the storage system are resilient to network node failures. The network failure resilience prioritization scheme specifies that the two switches in the system must be interleaved such that if any given switch fails, the next scheduled path connection operates from the opposite network node. Because, in this embodiment, the path order in Table 2 already satisfied the network failure resilience scheme, no changes occur from Table 2 to Table 3.

A storage node failure resiliency prioritization stage (the third stage as indicated by the circled number) is then applied to the path data of Table 3. The storage node failure resiliency prioritization stage prioritizes the paths such that the storage nodes are accessible in an alternating manner. However, in order to maintain satisfaction of the port function prioritization and network failure resilience prioritization schemes, the node failure resiliency stage can only be completed to a certain extent (e.g., with two instances of repeated nodes). However, in some embodiments, the node failure resiliency prioritization scheme can be maintained at the expense of the other prioritization schemes (e.g., based on weighting or differing the sequential order of the prioritization schemes) if it is not possible to satisfy each scheme based on the topology rules.

The resulting path data of Table 4 provides network and storage node failure resiliency while limiting connection to functional ports. The resulting path data is transmitted to device 350, and device 350 logs into the paths based on the discovery response.

Though the prioritization scheme in FIG. 3B includes stages, any other manner of prioritizing the path data can be completed. In some embodiments, multiple prioritization schemes are applied simultaneously. In some embodiments, only a single prioritization scheme may be specified in the topology rules. In some embodiments, weighted values can be implemented to dictate the priority of each prioritization scheme (e.g., port functionality can be weighted higher than node failure resiliency). In some embodiments, the path data can be manually prioritized. However, any other manner of prioritizing the paths otherwise consistent herein is contemplated.

Further, though the path data prioritization depicted in FIG. 3B is based on port function, network failure resiliency, and node failure resilience, any other metrics can be considered. For example, in some embodiments, path prioritization can be based on available bandwidth, memory, or processor utilization. In some embodiments, the prioritization can take into account the port access scheduling algorithm. In some embodiments, prioritization can consider proximity to hardware resources (e.g., server location, network node location, etc.). In some embodiments, ports can be prioritized based on the initiator's requirements or tasks.

In some embodiments, ports can be prioritized based on the type of hardware used (e.g., type of processors, types of data transfer cables (e.g., optical fibers, Ethernet, etc.)).

Figure 3C:
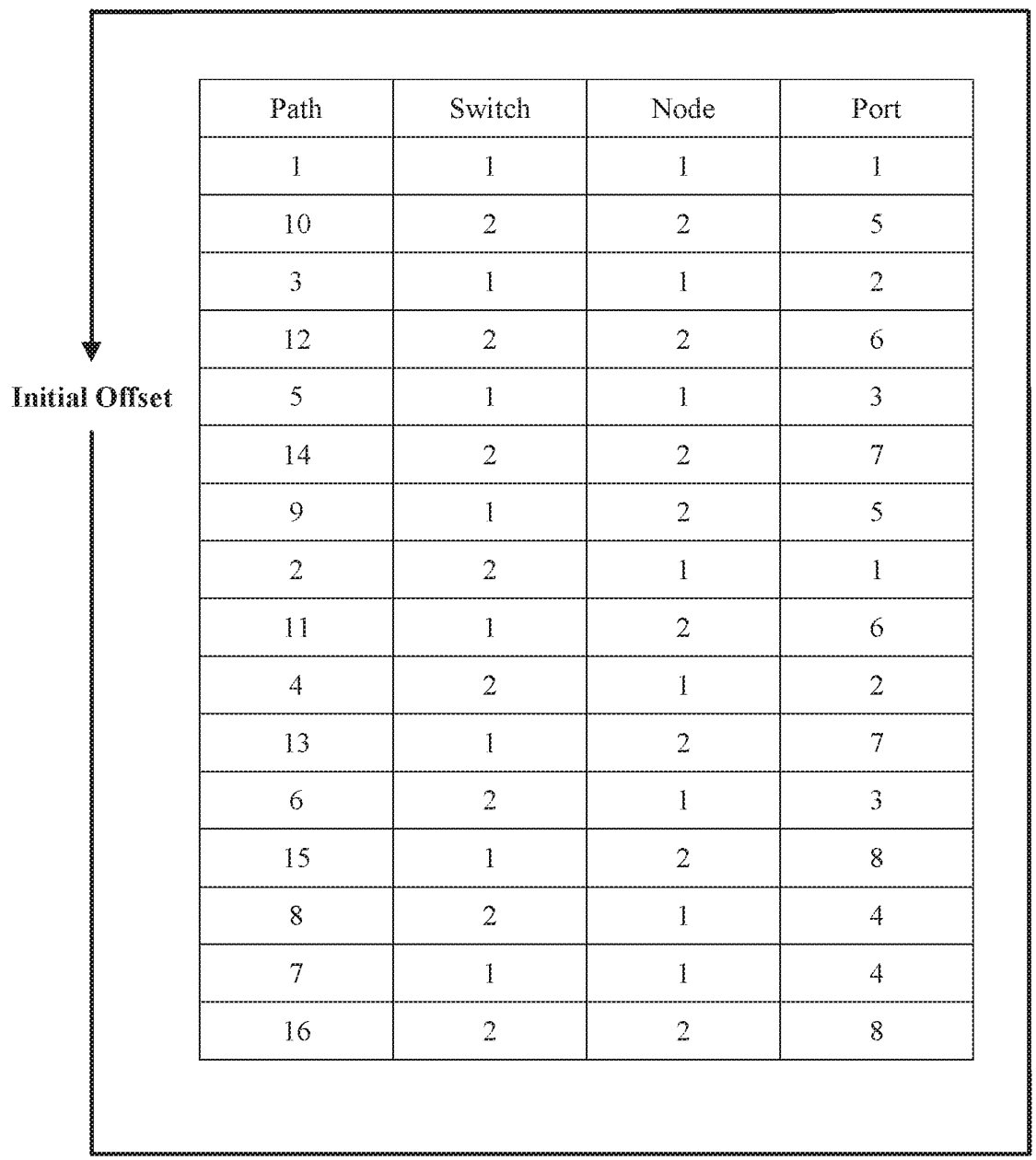
FIG. 3C is a diagram illustrating a cyclic buffer for Table 4 of FIG. 3B, in accordance with embodiments of the present disclosure.

FIG. 3C is a diagram illustrating a cyclic buffer for the path data of Table 4 from FIG. 3B, in accordance with embodiments of the present disclosure. The path data can be offset upon additional host connections to prevent excess connections to the same port, storage node, or switch. If multiple hosts connect to the configured path data in the same order, performance can be impeded by overburdening resources associated with the high priority paths. Accordingly, offsetting the paths such that the hosts connect to different paths (e.g., or such that resource utilization is uniform) can be beneficial.

For example, if a first host issues a discovery request and receives the path list according to FIG. 3C (e.g., the prioritized path data), the log-in will initiate at path 1. If a second host connects via the same path list at a later time, the list will be reordered, starting with path 5 (the offset is 4), generating an offset path data. The second host's path list will then end at path 12 (at which point the list will restart at path 5), while the first host's path list ends at path 16 (at which point the list will restart at path 1). For each additional host connection, the path list can be reordered based on the determined offset.

The offset can be determined based on a range of factors. In some embodiments, the offset can be based on the number of paths and the number of connected hosts. For example, if there are 16 available paths and four connected hosts, the offset can be determined by diving the number of paths by the number of connected hosts (e.g., 16 paths/4 hosts=4 offset). In some embodiments, the offset can be determined while considering port function metrics. In these embodiments, the offset can be determined to avoid functional ports upon new host connections. In some embodiments, the offset can be determined based on the proximity of the host to resources in a given path. In some embodiments, the offset can be determined manually. In some embodiments, the offset can depend on sought network nodes, storage nodes, or I/O ports. In some embodiments, the offset can depend on the scheduling algorithm in which the hosts are accessing the ports (e.g., if the scheduling algorithm specifies alternation between two I/O ports, the offset can be determined to be 2 paths).

Figure 4:
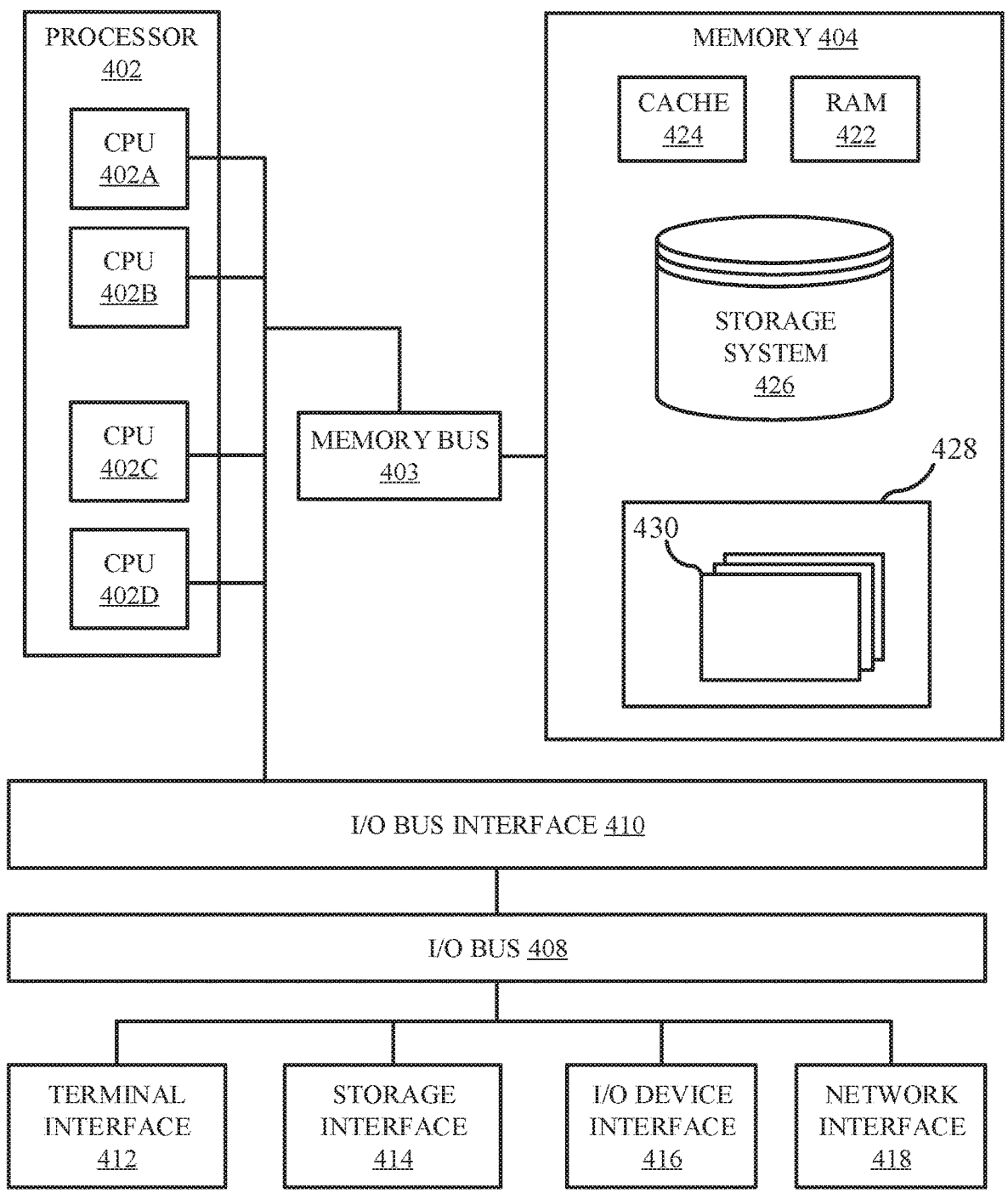
FIG. 4 is a high-level block diagram illustrating an example computer system that can be used in implementing one or more of the methods, tools, and modules, and any related functions, described herein, in accordance with embodiments of the present disclosure.

Referring now to FIG. 4, shown is a high-level block diagram of an example computer system 401 (e.g., devices 105, 305 and storage nodes 135, 360, 365) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include a topology management module. The topology management module may be configured to receive discovery requests and collect topology data relevant to the requestor. Further, the topology management module can be configured to identify all available paths for the requesting client, and selectively filter and prioritize the list of paths based on a set of topology rules.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
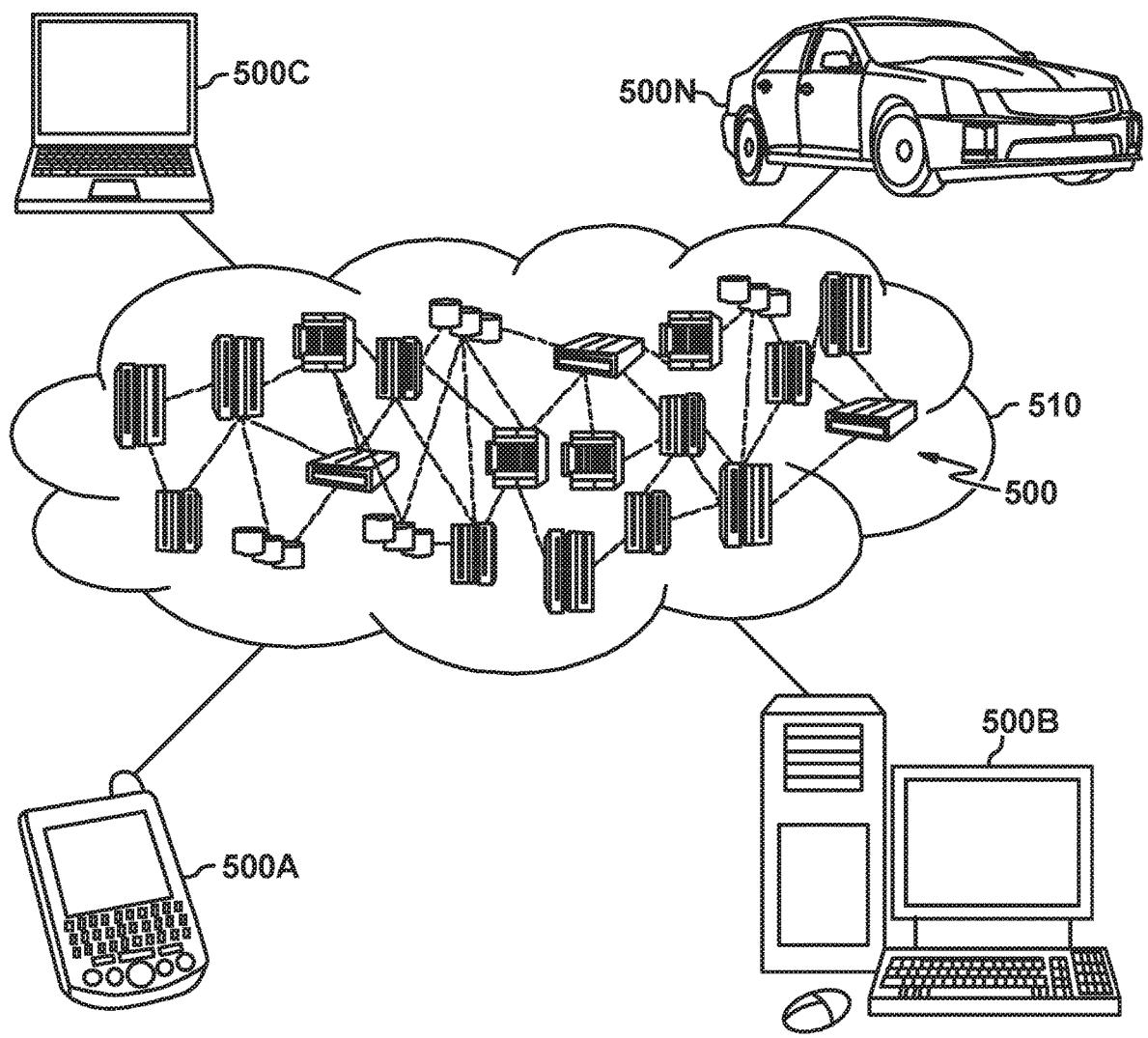
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B (e.g., devices 105, 305 and storage nodes 135, 360, 365) laptop computer 500C (e.g., devices 105, 305 and storage nodes 135, 360, 365), and/or automobile computer system 500N can communicate. Nodes 500 can communicate with one another. They can be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
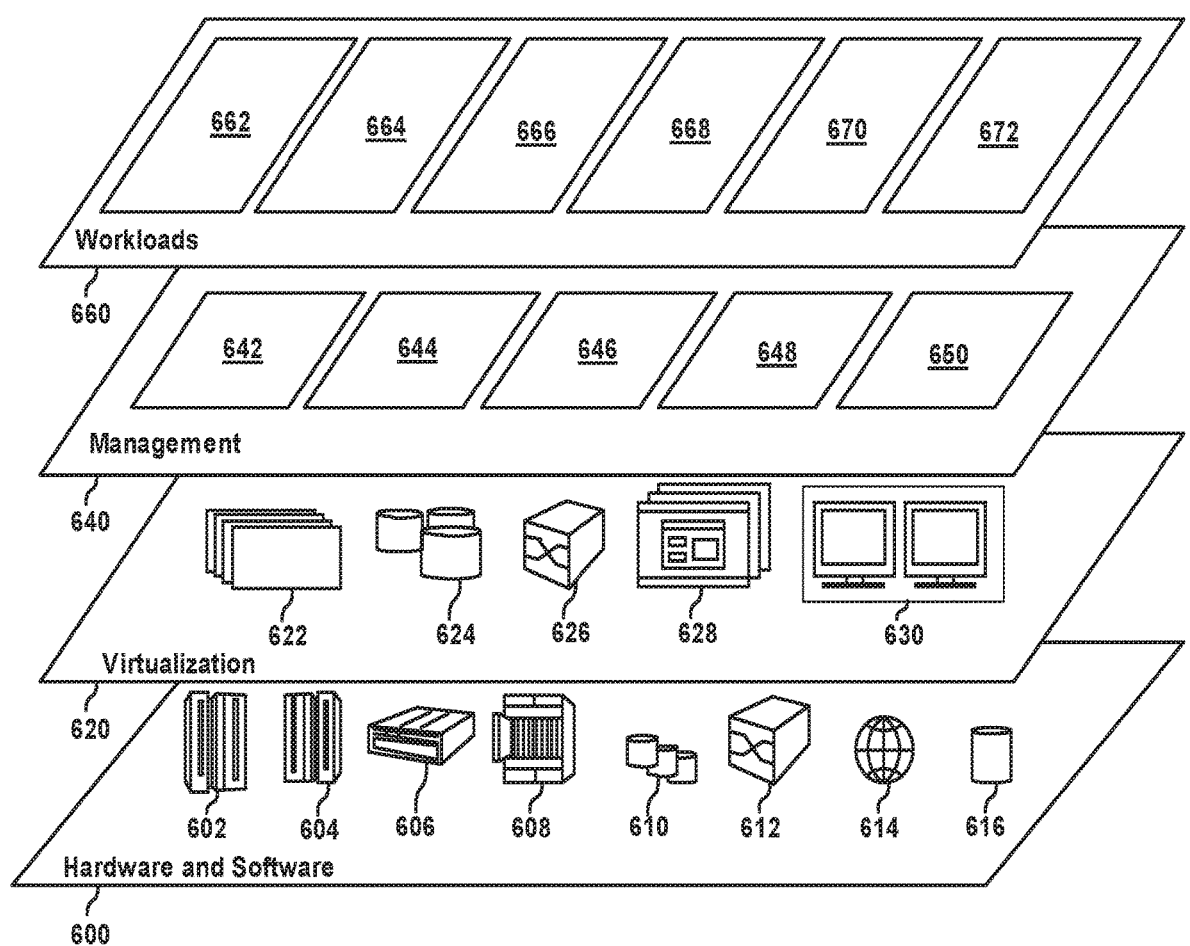
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. For example, resource provisioning 642 can allocate additional computing resources to devices (e.g., devices 105, 305) which are indicated to have high activity. Metering and Pricing 644 provide cost tracking as resources are utilized within the cloud computing environment, and billing or invoicing for consumption of these resources. In one example, these resources can include application software licenses. In some embodiments, Metering and Pricing 644 indicates the number of allotted licenses to machines (e.g., devices 105, 305 and storage nodes 135, 360, 365) in the system. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and identifying an identifiable media 672.

As discussed in more detail herein, it is contemplated that some or all of the operations of some of the embodiments of methods described herein may be performed in alternative orders or may not be performed at all, insofar as they are consistent herein; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
receiving, from a device, a storage target path discovery request;
collecting, in response to the storage target path discovery request, metrics associated with a storage target;
identifying, based on the collected metrics, available paths to the storage target;
determining a set of topology rules;
selecting, based on the topology rules and the collected metrics, a subset of the available paths;
prioritizing, based on the topology rules and the collected metrics, the subset of the available paths into a prioritized path data, wherein prioritizing includes ordering the subset of available paths according to the topology rules, wherein the subset of available paths is prioritized such that paths containing a same network node do not sequentially repeat in the prioritized path data;

storing the prioritized path data; and
transmitting the prioritized path data to the device.

2. The method of claim 1, further comprising:
receiving a port log-in request for a port of a storage node of at least one of the paths included in the prioritized path data; and
establishing a connection for the at least one port log-in request.

3. The method of claim 1, further comprising;
receiving, from a second device, a second storage target path discovery request;
determining, in response to the second storage target path discovery request, an offset from the prioritized path data;
reordering, based on the determined offset, the prioritized path data to generate an offset path data; and
transmitting the offset path data to the second device.

4. The method of claim 3, further comprising:
receiving a port log-in request for a port of a first path on the offset path data; and
establishing a connection of the second device to the first path.

5. The method of claim 1, wherein determining the set of topology rules further comprises defining a threshold minimum number of network nodes to be included in the subset of the available paths, wherein the paths in the subset of available paths are selected based on the paths in the subset including at least the threshold minimum number of network nodes.

6. The method of claim 1, wherein determining the set of topology rules further comprises determining a threshold minimum number of storage nodes, wherein the paths in the subset of available paths are selected based on the paths in the subset including at least the threshold minimum number of storage nodes.

7. The method of claim 1, wherein the subset of available paths is prioritized to interleave each storage node of the subset of available paths such that paths containing a same storage node do not sequentially repeat in the prioritized path data.

8. The method of claim 1, wherein collecting metrics of the storage target includes obtaining a processor utilization metric for each path of the available paths, wherein the subset of available paths are prioritized based on the processor utilization metric for each path.

9. The method of claim 1, wherein collecting metrics of the storage target includes determining a port function metric associated with each port at an endpoint of each available path, wherein the subset of available paths are prioritized based on the port function metric for each path.

10. A system comprising:
a device;
a storage target;
at least one memory component;
at least one processor; and
a topology management module configured to perform a method comprising;
  receiving, from the device, a storage target path discovery request;
  collecting, in response to the storage target path discovery request, metrics associated with the storage target;
  identifying, based on the collected metrics, available paths to the storage target;
  determining a set of topology rules;
  selecting, based on the topology rules and the collected metrics, a subset of the available paths;
  prioritizing, based on the topology rules and the collected metrics, the subset of the available paths into a prioritized path data, wherein prioritizing includes ordering the subset of available paths according to the topology rules, wherein the subset of available paths is prioritized such that paths containing a same network node do not sequentially repeat in the prioritized path data;
  storing the prioritized path data;
  transmitting the prioritized path data to the device;
  receiving a port log-in request for a storage node of at least one of the paths included in the prioritized path data; and
  establishing a connection for the at least one port log-in request.

11. The system of claim 10, wherein the system further comprises a second device, wherein the method performed by the processor further comprises:
receiving, from the second device, a second storage target path discovery request;
determining, in response to the second storage target path discovery request, an offset from the prioritized path data;
reordering, based on the determined offset, the prioritized path data to generate an offset path data;
transmitting the offset path data to the second device;
receiving a port log-in request to a first path on the offset path data; and
establishing a connection of the second device to the first path.

12. The system of claim 10, wherein determining the set of topology rules further comprises determining a threshold number of paths to be included in the prioritized path data, wherein the subset of available paths is selected based on the threshold number of paths.

13. The system of claim 10, wherein the subset of available paths is prioritized to interleave each storage node of the subset of available paths such that paths containing a same storage node do not sequentially repeat in the prioritized path data.

14. The system of claim 10, wherein collecting metrics of the storage target includes obtaining a bandwidth availability metric for each path of the available paths, wherein the subset of available paths are prioritized based on the bandwidth availability metric for each path.

15. The system of claim 10, wherein collecting metrics of the storage target includes determining a port function metric associated with each port at an endpoint of each available path, wherein the subset of available paths are prioritized based on the port function metric for each path.

16. A computer program product comprising a computer readable storage medium having program instructions embodied therewith, the program instructions executable by a processor to cause the processor to perform a method comprising:
receiving, from a device, a storage target path discovery request;
collecting, in response to the storage target path discovery request, metrics associated with a storage target;
identifying, based on the collected metrics, available paths to the storage target;
determining a set of topology rules;
selecting, based on the topology rules and the collected metrics, a subset of the available paths;
prioritizing, based on the topology rules and the collected metrics, the subset of the available paths into a prioritized path data, wherein prioritizing includes ordering the subset of available paths according to the topology rules, wherein the subset of available paths is prioritized such that paths containing a same network node do not sequentially repeat in the prioritized path data;

storing the prioritized path data;

transmitting the prioritized path data to the device;

receiving a port log-in request for a storage node of at least one of the paths included in the prioritized path data; and establishing a connection for the at least one port log-in request.

17. The computer program product of claim 16, wherein the method further comprises:

receiving, from a second device, a second storage target path discovery request;

determining, in response to the second storage target path discovery request, an offset from the prioritized path data;

reordering, based on the determined offset, the prioritized path data to generate an offset path data;

transmitting the offset path data to the second device;

receiving a port log-in request to a first path on the offset path data; and establishing a connection of the second device to the first path.

18. The computer program product of claim 16, wherein collecting metrics of the storage target includes determining a processor utilization availability metric and a bandwidth availability metric of each path, wherein the processor utilization availability metric and bandwidth availability metric are weighted and combined to generate a resource availability metric, wherein the subset of available paths are prioritized based on the resource availability metric.

\* \* \* \* \*